United States Patent [19]

Matsunawa et al.

[11] Patent Number: 4,864,357
[45] Date of Patent: Sep. 5, 1989

[54] COLOR IMAGE PROCESSING APPARATUS

[75] Inventors: Masahiko Matsunawa; Hiroyuki Yamamoto; Yoshinori Abe, all of Hachioji, Japan

[73] Assignee: Konica Corporation, Tokyo, Japan

[21] Appl. No.: 128,335

[22] Filed: Dec. 3, 1987

[30] Foreign Application Priority Data

Dec. 3, 1986 [JP] Japan .................. 61-288314

[51] Int. Cl.⁴ .......................................... G03B 27/32
[52] U.S. Cl. ....................................... 355/32; 355/77;
355/326; 358/300; 358/80; 364/526
[58] Field of Search ..................... 355/32, 38, 77, 4;
358/76, 80

[56] References Cited

U.S. PATENT DOCUMENTS 4,661,703 4/1987 Ishikawa et al. ................. 355/32
4,668,082 5/1987 Terashita et al. ................. 355/77
4,692,797 9/1987 Matsumoto ................... 355/68 X Primary Examiner—L. T. Hix
Assistant Examiner—D. Rutledge
Attorney, Agent, or Firm—Jordan B. Bierman

[57] ABSTRACT

A color image processing apparatus wherein different color filters are provided in an image pickup device corresponding to plural groups of small pixels, each group of which is one unit of color pixels, and color image signals are obtained from the common position of the small pixel groups by suitably interpolating color image signals obtained from the small pixel groups.

13 Claims, 13 Drawing Sheets

FIG.3
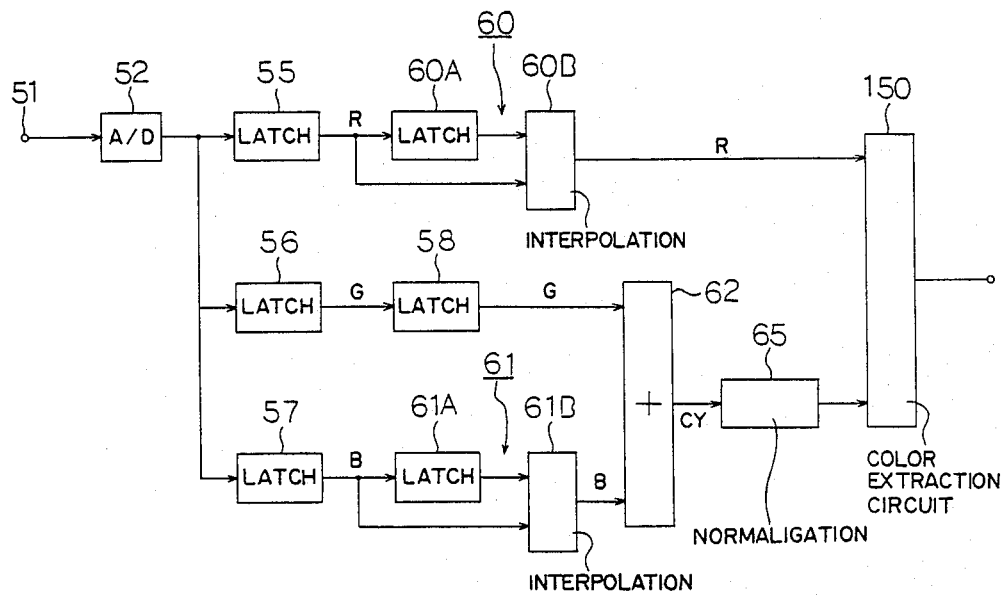
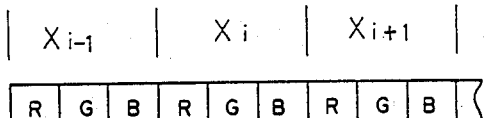
FIG.4A
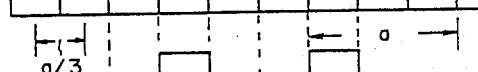
FIG.4B
FIG.4C
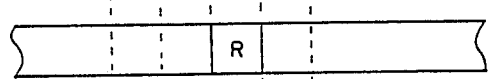
FIG.4D
FIG.4E
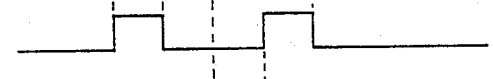
FIG.4F
FIG.4G

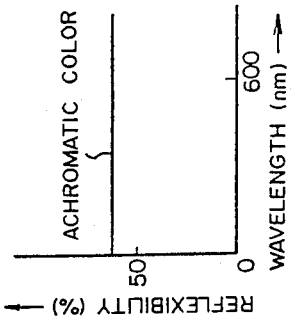
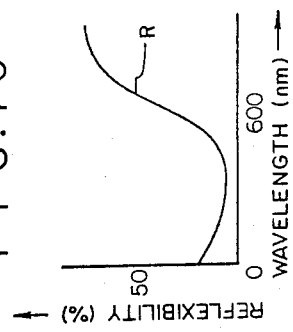
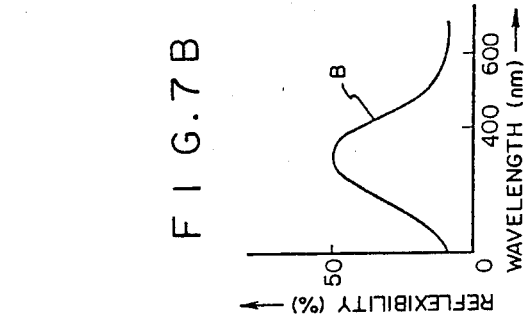

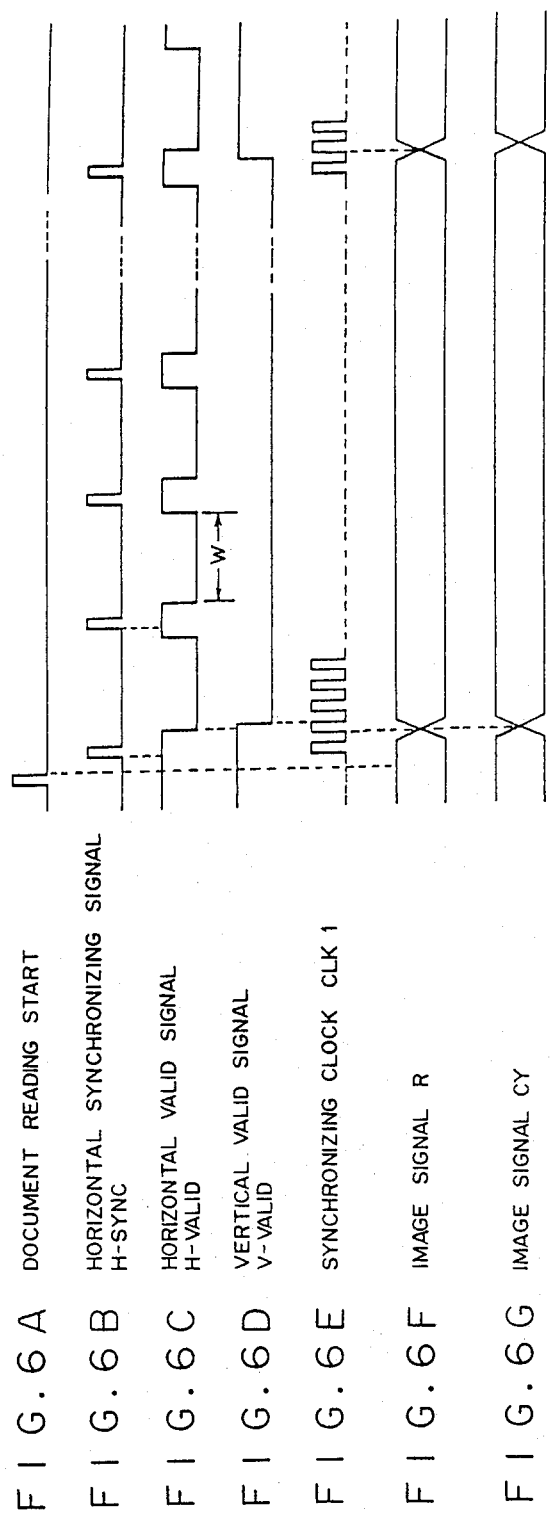

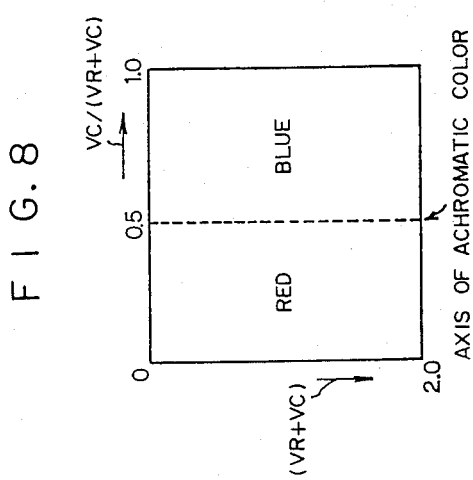

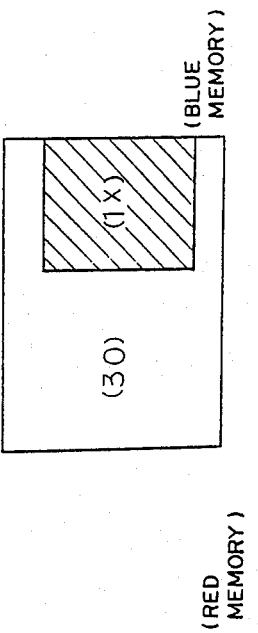
FIG. 11A
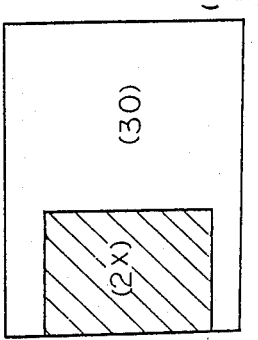
FIG. 11B
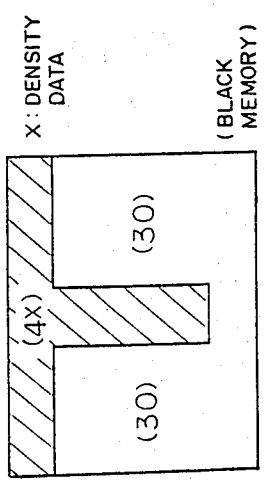
FIG. 11C
FIG. 12
| INPUT CODE | OUTPUT | |
|---|---|---|
| | L | H |
| 0 0 (BLACK) | 0 0 | 1 1 |
| 0 1 (BLUE) | 0 1 | 1 1 |
| 1 0 (RED) | 1 0 | 1 1 |
| 1 1 (WHITE) | 1 1 | 1 1 |
FIG. 14
| | P1 | P2 | P3 | P4 |
|---|---|---|---|---|
| WHITE | 0 | 0 | 0 | 1 |
| GREY | 0 | 1 | 0 | 0 |
| BLACK | 1 | 1 | 1 | 0 |

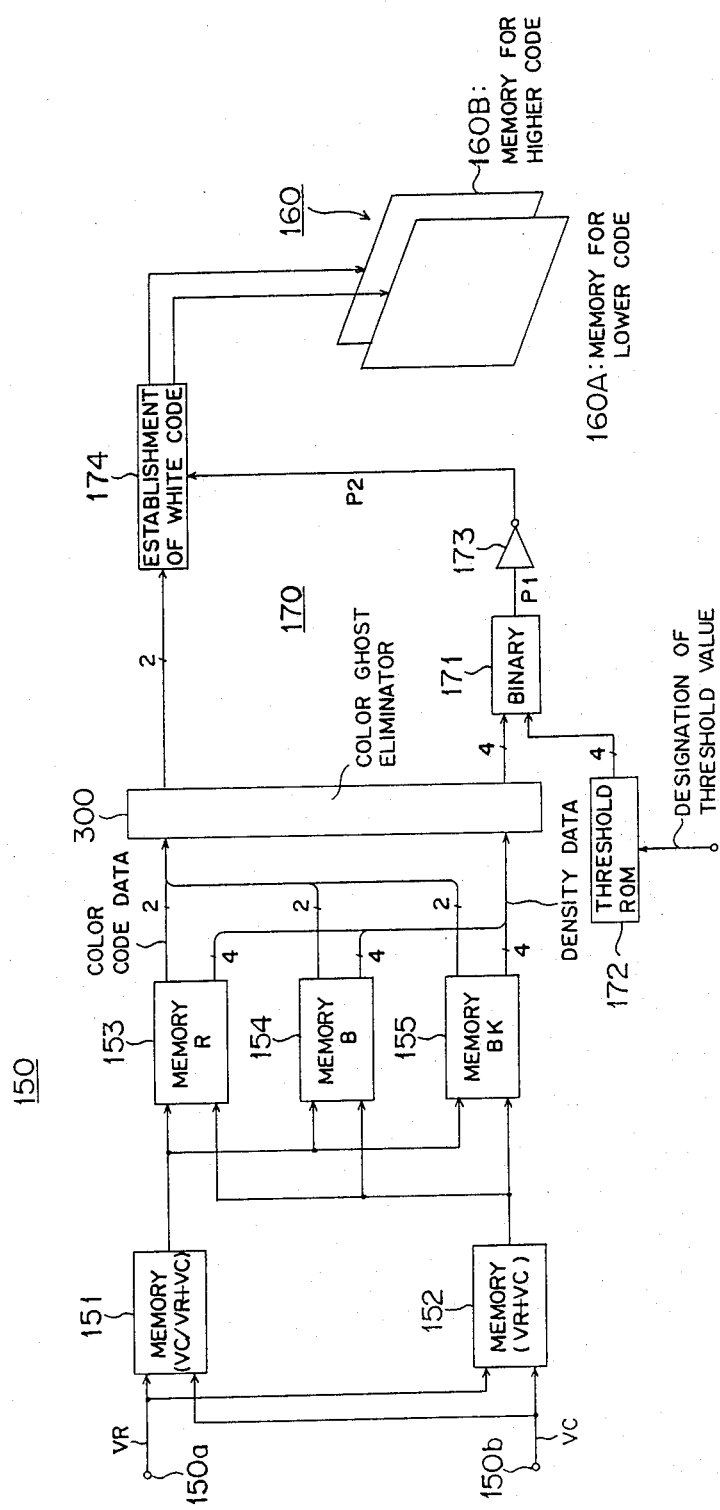

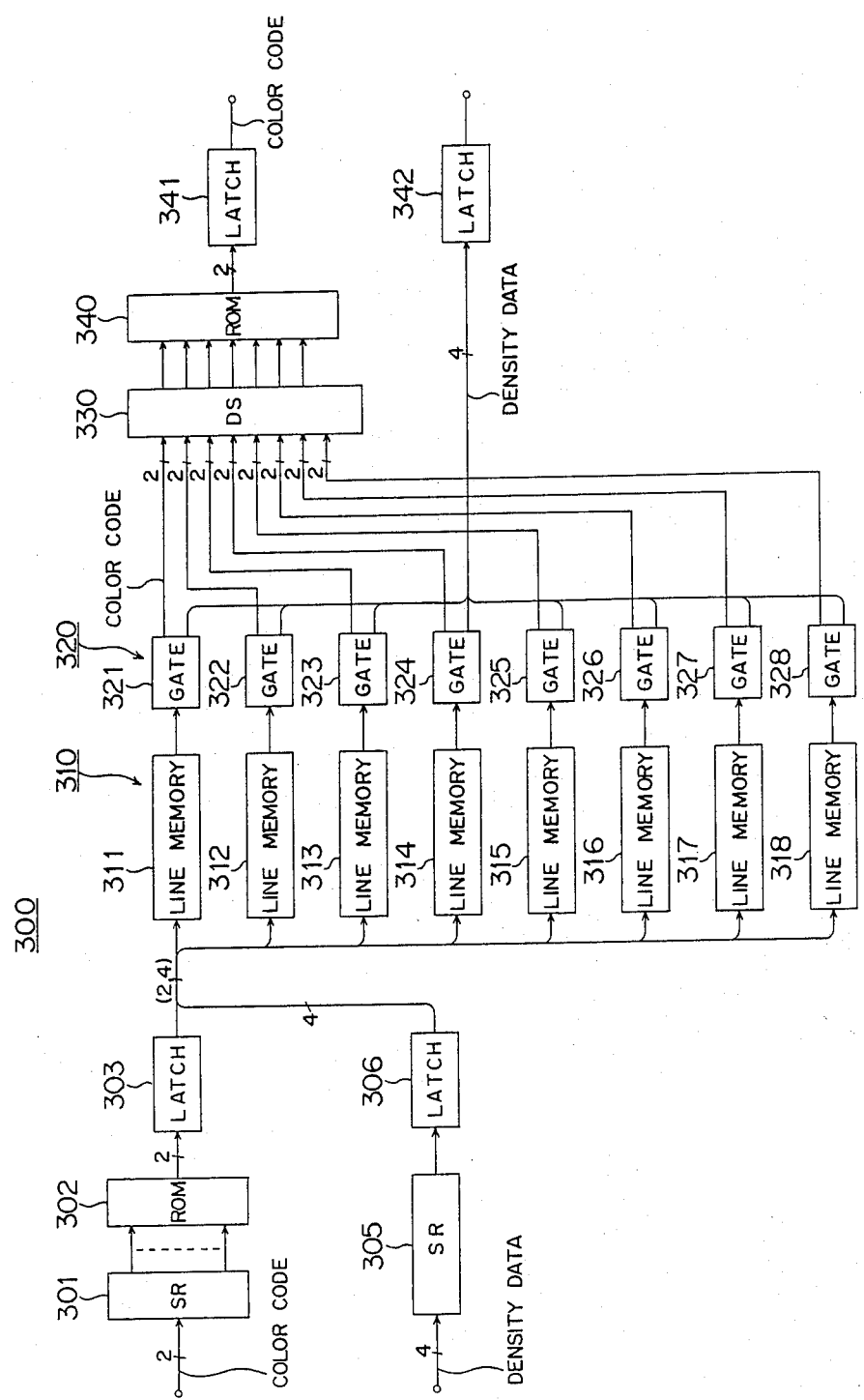

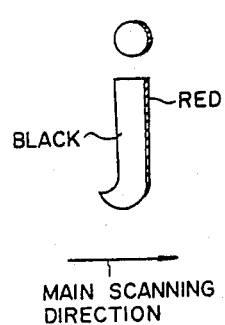
FIG. 21A
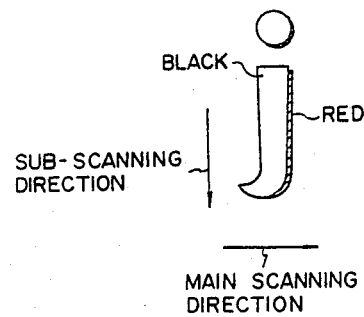
FIG. 21B
FIG. 22
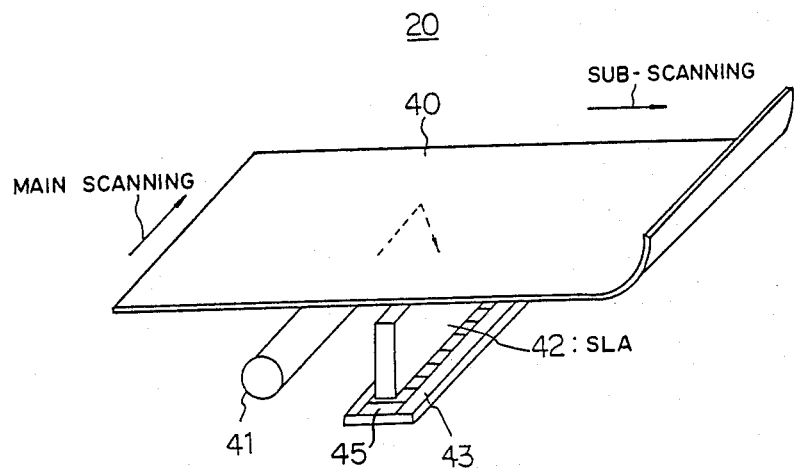
FIG. 23
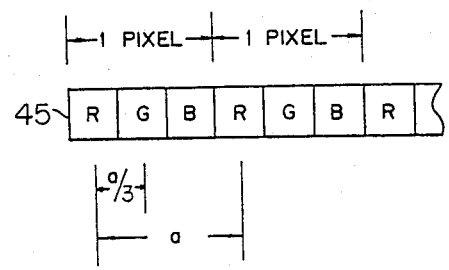

COLOR IMAGE PROCESSING APPARATUS

BACKGROUND OF THE INVENTION

1. Field of the Invention

The present invention relates to a color image processing apparatus which is suitable when applied to a simplified electrophotographic type color reproducing machine using a contact type image sensor.

2. Description of the Prior Art

There is known in the prior art a color image processing apparatus for optically reading image informations such as a document to record them on a sheet of recording paper by means of an electrophotographic type color reproducing machine.

In case the electrophotographic type color reproducing machine, the document containing color image informations is usually transformed into a plurality of color informations (including an achromatic color), on the basis of which are performed processes for forming an electrostatic latent image, developing the electrostatic image and fixing the developed image.

For these processes, an image pickup system 20 for picking up the document for frequent uses has a construction shown in FIGS. 19 and 20.

FIG. 19 shows an image pickup system in which the color image informations of the document are transformed into three primary color signals, i.e., red, green and blue color signals.

This pickup system 20 is constructed of first and second pickup subsystems 20A and 20B, as shown. The first pickup subsystem 20A is composed of a pair of prisms 21 and 22 and a dichroic mirror 25 to form a blue color separation image, which is focused on a pickup element 29 to output blue signals B.

The second pickup subsystem 20B is also composed of a pair of prisms 23 and 24 and a dichroic mirror 26. The optical image having passed through the first pickup subsystem 20A is extracted at the second pickup subsystem 20B into red and green color separation images. These red and green color separation images are then formed upon pickup elements 27 and 28, respectively, to output green signals G and red signals R.

The image pickup system 20 shown in FIG. 20 corresponds to the case of extraction into two color signals and is also constructed of the paired prisms 23 and 24 and a dichroic mirror 32. In the shown example, the image is separated into red and cyan color separation images by the dichroic mirror 32 so that red and cyan signals R and Cy are obtained from pickup elements 27 and 31, respectively.

Incidentally, in case the image signals are to be processed by using the image pickup system 20 thus constructed, color ghosts shown in FIGS. 21A and 21B would be produced in the constructions of FIGS. 19 and 20 unless the color extraction optical images were correctly formed in the normal positions of two or three pickup elements.

In order to eliminate the color ghosts, a plurality of pickup elements have to be stably positioned within a quarter pixel. In case, therefore, the pickup elements used have a pixel pitch of $7\mu$, the mounting accuracy is required to be within 1 to $2\mu$.

However, retention of such mechanical mounting accuracy is technically difficult, remarkably drops the yield of the image pickup system and causes the production cost-up.

In order to solve this problem, it is conceivable to use the image pickup system 20 using a contact type pickup element 43, as shown in FIG. 22.

Below a document 40 to be picked up, as shown in FIG. 22, there is arranged a light source such as a warm-white type fluorescent lamp 41 for illuminating the document 40. In the vicinity of the light source 41, there is disposed a SELFOC lens array (SLA) 42 which is arranged in parallel with the transverse direction (or the main scanning direction) of the document 40.

Moreover, the line-shaped pickup element (e.g., the contact type line sensor) 43 made of a CCD of the like is disposed in contact with a light guide which is formed in the lower face of that SLA 42.

Since the reflected light of the document 40 illuminates the pickup element 43 through the SLA 42, the color image of the document 40 is transformed into predetermined color image signals.

Incidentally, in case the contact type pickup element 43 is used in the image pickup system 20 to pickup the document 40, there is produced no color ghost due to the aforementioned mechanical mounting errors of the pickup element.

In order to separate the color image informations, however, there is attached to the front face of the pickup element 43 a color filter 45 which is composed in repetition of R, G and B as its units, for example, as shown in FIG. 23. As a result, the three small pixels R, G and B constitute one pixel.

If one pixel pitch is denoted as a, therefore, the small pixels are arranged with a mechanical pitch of a/3 so that the color ghosts similar to the aforementioned ones are produced.

SUMMARY OF THE INVENTION

An object of the present invention is to provide a color image processing apparatus which is enabled to electrically correct the color ghosts due to the pickup element itself.

In order to solve the above-specified problems, according to the present invention, there is provided a color image processing apparatus comprising an image pickup system having different color filters corresponding to plural groups of small pixels, each group of which is one unit of color pixels, wherein the improvement resides in that color image signals are obtained from the common position of the small pixel groups by suitably interpolating the color image signals obtained from said small pixel groups.

The color image informations are transformed into a plurality of color informations such as three primary color signals. In this case of three primary color signals, the color signals obtained from before and behind ones of the center of small pixels arranged in a line are interpolated.

Here, the interpolation executed is such that the color signals obtained from that small pixels as a result of interpolations come to the mechanically identical position to that of the color signals obtained from the center small pixel.

As a result, all the three color signals are equivalent to those obtained from the common position so that the color ghosts resulting from the structure of the pickup element itself can be removed effectively and reliably.

BRIEF DESCRIPTION OF THE DRAWINGS

Other objects and features of the present invention shall become apparent from the following description taken with reference to the accompanying drawings, in which:

FIG. 3 is a system diagram showing one example of an image reader;

FIGS. 4A to 4G are diagrams used for explaining the interpolations;

FIG. 5 is a table showing one example of interpolation data;

FIG. 6A to 6G are waveform charts used for explaining image reading operations;

FIGS. 7A to 7C and FIG. 8 are diagrams used for explaining color extractions;

FIG. 9 is a table showing one example of a color extraction map;

FIGS. 11A to 11C are diagrams showing memory storage state used for explaining the operations;

FIG. 12 is a table showing the truth values of a white code establisher;

FIG. 14 is a diagram used for explaining the logical operations;

FIG. 15 is a system diagram showing still another example of FIG. 10;

FIG. 16 is a system diagram showing a specific example of a color ghost eliminator;

FIGS. 21A and 21B are diagrams showing examples of the color ghosts established;

FIG. 22 is a structure showing one example of the image pickup system used for explaining the present invention; and FIG. 23 is a descriptive diagram for explaining the color filter used for the image pickup system.

DESCRIPTION OF THE PREFERRED EMBODIMENT

Figure 1:
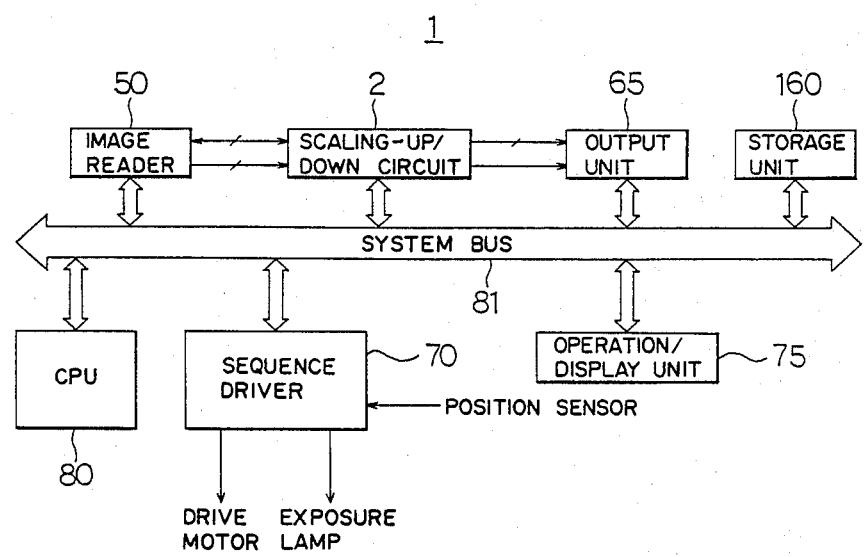
FIG. 1 is a system diagram showing the summary of a color image processing apparatus according to the present invention.

The color image processing apparatus according to the present invention will be described in detail with reference to FIG. 1 and so on.

Incidentally, the embodiment to be described corresponds to the case in which the present invention is applied to the color image processing apparatus using an electrophotographic type color reproducing machine as an output device.

Therefore, the schematic construction of such color image processing apparatus, to which the present invention is applied, will first be described with reference to FIG. 1.

Image informations of a document are subjected to color extraction, A/D conversion and another image processing by an image reader 50 so that they are transformed into image data of predetermined bit numbers corresponding to respective color signals, e.g., image data of 16 gradations (0 to F).

An image pickup system to be used in the image reader 50 is the image pickup system 20 which has the contact type pickup element 43 shown in FIG. 22. As a result, the color image informations of the document 40 are transformed into three primary color signals R, G and B which are further converted into digital signals.

The individual image data are subjected to image processing such as scaling-up/down processing by the scaling-up/down circuit 2 according to the linear interpolation.

In this case, interpolated data to be used as the image data after having scaled up and down are stored in an interpolation table (i.e., an interpolation ROM), and both the image data before the scaling-up/down processing and interpolation selection data stored in a data ROM are used as signals for selecting those interpolated data. The necessary interpolation selection data are selected in response to an instruction from a system control circuit 80 according to the designation of a magnification.

The image data processed are fed to an output unit 65 so that the image is recorded with the magnification set at the outside. The output unit 65 is exemplified by the electrophotographic type color reproducing machine.

Either the image data obtained from the image reader 50 or the processed image data are stored in a storage unit 160.

The image reader 50 is equipped with components such as a drive motor for moving the image pickup system 20 in the feed direction of the document 40 and an exposure lamp, and these components are controlled at a predetermined timing in response to an instruction signal from a sequence control circuit 70. This sequence control circuit 70 is fed with data from a position sensor (although not shown).

An operation/display unit 75 is given a variety of input data for designating the magnification, recording position, recording color and so on and displays their contents. An element such as an LED is used as display means.

The aforementioned various controls and the control and state management of the image processing apparatus in its entirety are controlled by the system control circuit 80. For this purpose, a microcomputer control is suitable for those system controls.

FIG. 1 presents an example of the microcomputer control, in which the necessary image processing data and control data are transferred between the control circuit 80 and the aforementioned various circuits by way of a system bus 81.

The image reader 50 is fed with an image read starting signal, a recording color designating signal and so on through the system bus 81.

The scaling-up/down circuit 2 is fed with the magnification data, which are designated by the operation/display unit 75, through the system bus 81 after they have once been taken by the control circuit 80.

Incidentally, the binary processing of the image data could be accomplished in that scaling-up/down circuit 2 but is performed at the image reader 50 in the present invention.

In this case, threshold data for the binary operation can be selected in accordance with the kind and density of the image to be recorded. A selection instruction signal of the threshold data is fed through the system bus 81.

The output unit 65 is fed with a start signal for image recording and a selection signal for the recording paper size.

These components will be described in detail in the following.

For conveniences of description, one example of the structure of a simplified type color reproducing machine to be applied to the present invention will be described with reference to FIG. 2.

The shown color reproducing machine records a color image by separating a color information into three kinds of color informations. These three kinds of extracted color informations are exemplified by those of black BK, red R and blue B, to which the present invention should not be limited.

Figure 2:
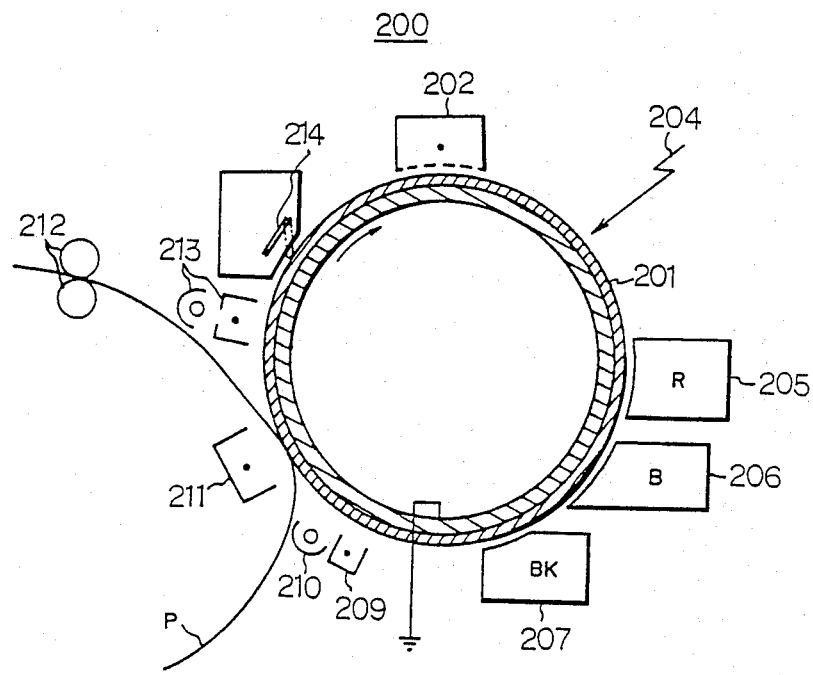
FIG. 2 is a structure showing one example of a simplified electrophotographic type color reproducing machine.

In FIG. 2, reference numeral 200 denotes one example of the essential portion of the color reproducing machine, and numeral 201 denotes a drum-shaped image retainer which has a photoconductive photosensitive layer made of selenium Se or OPC (i.e., organic semiconductor) formed on its surface so that it can form an electrostatic latent image corresponding to an optical image.

Around the circumference of the image retainer 201, there are arranged to the rotational direction members which are to be sequentially described in the following.

The surface of the image retainer 201 is uniformly charged by a charging device 202 and is then subjected to an image exposure (of an optical image 204) based upon each of the color separation images.

The exposed images are developed by predetermined developing devices. These developing devices arranged are of a number corresponding to that of the color separation images. In this example, a developing device 205 charged with a developer of red toner, a developing device 206 charged with a developer of blue toner and a developing device 207 charged with a developer of black toner are so arranged toward the surface of the image retainer 201 in the recited order, as taken in the rotating direction of the image retainer 201.

These developing devices 205 to 207 are sequentially selected in synchronism with the rotation of the image retainer 201. If the developing device 207 is selected, for example, the toner adheres to the electrostatic image based on a black color separation image to develop this black color separation image.

At the side of the developing device 207, there are disposed a charging device 209 before transfer and a exposure lamp 210 before transfer, by which is facilitated the transfer of the color image to a recording medium P. Despite of this fact, however, the charging device 209 and the exposure lamp 210 are provided, if necessary.

A color or dichroic image having been developed on the image retainer 201 is transferred to the recording medium P by the action of a transfer device 211. The recording medium P has its transferred image fixed by a fixing device 212 disposed downstream, until it is discharged.

Incidentally, a charge eliminating device 213 to be disposed, if necessary, is constructed of one or a combination of a charge eliminating lamp and a charge eliminating corona discharging device.

A cleaning device 214 is composed of a cleaning blade and a fur brush, by which the residual toner on the surface of the image retainer 201 on which image has been transferred is cleared.

As is well known in the art, this cleaning operation is accomplished and the cleaning device 214 is separated from the surface of the image retainer 201 before the surface having developed arrives.

The charging device 202 may be exemplified by a scorotron corona discharging device. This discharging device is advantageous in that it is less influenced by the preceding charging operation so that it can apply stable charges to the image retainer 201.

The image exposure 204 may be exemplified by that obtained from a laser beam scanner. This laser beam scanner can record a clearer color image.

For at least second and later developments to be repeated to superpose the color toner images, care should be taken not to allow a subsequent development to offset the toner, which has adhered to the image retainer 201 by the previous development. From this point of view, it is preferable that this development is exemplified by the non-contact jumping development. FIG. 2 shows the developing device of the type for this non-contact jumping operation.

The developer may preferably be exemplified by the so-called "two-component developer". This two-component developer is advantageous in that it has a clear color and can easily control the charges of the toner.

FIG. 3 shows one example of the image reader 50.

As shown, an input terminal 51 is fed with color image signals, which have been picked up by the image pickup system 20 shown in FIG. 21. These color image signals are fed to an A/D converter 52 so that they are converted into digital color image signals.

These digital color image signals are once latched in a sequential manner by latch circuits 55 to 57, from which are obtained color-extracted red, green and blue signals R, G and B.

After this, interpolations of the red signal R and the blue signal B are performed to make adjustments of the mechanical positions relative to the green signal G, i.e., the time-axis adjustments.

For this, the green signal G providing a reference of the time axis is fed through a time-axis adjusting latch circuit 58 to a composer 62.

On the contrary, the red signal R and the blue signal B are fed to interpolators 60 and 61, respectively, to effect the time-axis corrections.

Here, since the adjoining small pixels R and B are positioned at a spacing of a/3 from the small pixel G, the individual color signals at a pixel Xi are expressed in the following formulas, as shown in FIGS. 4A to 4G:

$$R(Xi+a/3, t), G(Xi, t) \text{ and } B(Xi-a/3, t) \tag{1}$$

Here:
i: Pixel Number;
X: Pixel Position; and
t: Time.

Moreover, the aforementioned formulas are interpolated by using the adjoining pixels $Xi-1$ and $Xi+1$:

$$R(Xi+a/3, t) = (\tfrac{2}{3}).R(Xi) + (\tfrac{1}{3}).R(Xi+1) \tag{2}$$

and $$B(Xi-a/3, t) = (\tfrac{2}{3}).B(Xi-1) + (\tfrac{1}{3}).R(Xi) \tag{3}$$

By the interpolations of the formula (2), the time axis of the red signal R is interpolated to be aligned with the time axis of the green signal G obtained at the pixel Xi (as shown in FIGS. 4B, 4C and 4G).

Likewise, by the interpolations of the formula (3), the time axis of the blue signal B is interpolated to be aligned with the time axis of the green signal G obtained at the pixel Xi (as shown in FIGS. 4D, 4E and 4G).

In order to realize these interpolations, the interpolators 60 and 61 are composed of latches 60A and 61A and ROMs 60B and 61B storing interpolation data (i.e., the image levels after the interpolations), respectively. The levels of the color signals adjacent to each other are fed as address signals to the ROMs 60B and 61B, respectively.

FIG. 5 shows one example of the interpolation data.

The green signal G and the interpolated blue signal B are fed to the composer 62 so that they are transformed into cyan signals Cy, which are then normalized by a normalizer 65.

After this, the normalized cyan signals Cy are fed to a downstream color extraction circuit 150 so that a plurality of color signals R, B and BK necessary for the color image recording are extracted therefrom.

Incidentally, since there is adopted the image forming process for developing a color image of one color for one rotation of the image retainer 201, as has been described above, the developing devices 205 to 207 are selected in synchronism with the rotations of the image retainer 201 so that the corresponding color signals are sequentially selected and outputted.

FIGS. 6A to 6G illustrate the relationships between the image signals R and Cy and a variety of timing signals. A horizontal valid signal (H-VALID) (shown in FIG. 6C) corresponds to the maximum reading width of the pickup element 43, and the image signals R and Cy shown in FIGS. 6F and 6G are read out in synchronism with a synchronizing clock CLK1 (as shown in FIG. 6E).

The aforementioned color extractions (i.e., the color extractions from two-color signals to three-color signals) are accomplished on the basis of the following concepts.

FIGS. 7A to 7C schematically illustrate the spectroscopic reflecting characteristics of the color charts of color components. FIG. 7A illustrates the spectroscopic reflecting characteristics of the achromatic color; FIG. 7B illustrates the spectroscopic reflecting characteristics of the blue color; and FIG. 7C illustrates the spectroscopic reflecting characteristics of the red color. The abscissa denotes the wavelength (nm), and the ordinate denotes the reflexibility (%).

If the levels of the red signal R and the cyan signal Cy, which are normalized with reference to the white color, are denoted at VR and VC, respectively, a coordinate system is prepared from these signals VR and VC so that the red, blue and black colors are extracted on the basis of the color extraction map prepared. For determining the coordinate axes, the following points have to be taken into consideration:

I. In order to express a halftone, the concept of the reflexibility (i.e., the reflecting density) of the document 40 corresponding to the luminance signals of TV signals is introduced.

II. The concept of the color differences (including the hue and the saturation) of red and cyan is introduced.

Therefore, the following formulas may be used as the luminance signal information (e.g., a digital signal of 5 bits) and the color difference signal information (e.g., a digital signal of 5 bits):

*Luminance Signal Information* $= VR + VC$ \hfill (4);

wherein:

$0 \leq VR \leq 1.0$ \hfill (5);

$0 \leq VC \leq 1.0$ \hfill (6);

and $0 \leq VR + VC \leq 2.0$ \hfill (7).

The sum (VR+VC) of VR and VC corresponds to the range from the black level (=0) to the white level (=2.0) so that all the colors exist in the range from 0 to 2.0.

Color Difference Signal Information \hfill (8)

$= VR/(VR + VC)$ or $= VC/(VR + VC)$.

In the case of the achromatic color, the ratios of the red level VR and the cyan level VC contained in the total level (VR+VC) are constant. Hence:

$$VR/(VR + VC) = VC/(VR + VC) \quad (9)$$
$$= 0.5.$$

On the other hand, the ratio of a chromatic color can be expressed by the following formulas, for the red color:

$0.5 < VR/(VR+VC) \leq 1.0$ \hfill (10);

and $0 \leq VC/(VR+VC) < 0.5$ \hfill (11), for the cyan color:

$0 \leq VR/(VR+VC) < 0.5$ \hfill (12);

and $0.5 < VC/(VR+VC) \leq 1.0$ \hfill (13).

As a result, the chromatic color (i.e., the red and blue colors) and the achromatic color can be clearly extracted merely by level comparison processing using as the coordinate axes the coordinate system having the two axes of (VR+VC) and VR/(VR+VC), or (VR+VC) and VC/(VR+VC).

FIG. 8 illustrates the coordinate system in which the luminance signal component (VR+VC) is taken on the ordinate and the color difference signal component VC/(VR+VC) is taken on the abscissa.

If VC/(VR+VC) is used as the color difference component, the region smaller than 0.5 belongs to the red color R whereas the region larger than 0.5 belongs to the blue color B. The achromatic color is present in the region in the vicinity of color difference signal information=0.5 and in the region of less luminance signal information.

Thus, by detecting the levels of the red signal R and the cyan signal Cy, the three color signals R, B and BK of the red, blue and black can be extracted and outputted from the color information signals of the color document.

FIG. 9 illustrates a specific example of the color extraction map in which the colors are extracted by the aforementioned color extraction method. This ROM table stores the quantitized density corresponding values which are obtained from the reflecting densities of the document 40. In the shown example, the map is divided into 32×32 blocks.

Incidentally, as a matter of fact, the map is prepared with the ROMs of a number of colors to be extracted and stores the respective corresponding map data, as will be described in detail hereinafter.

Figure 10:
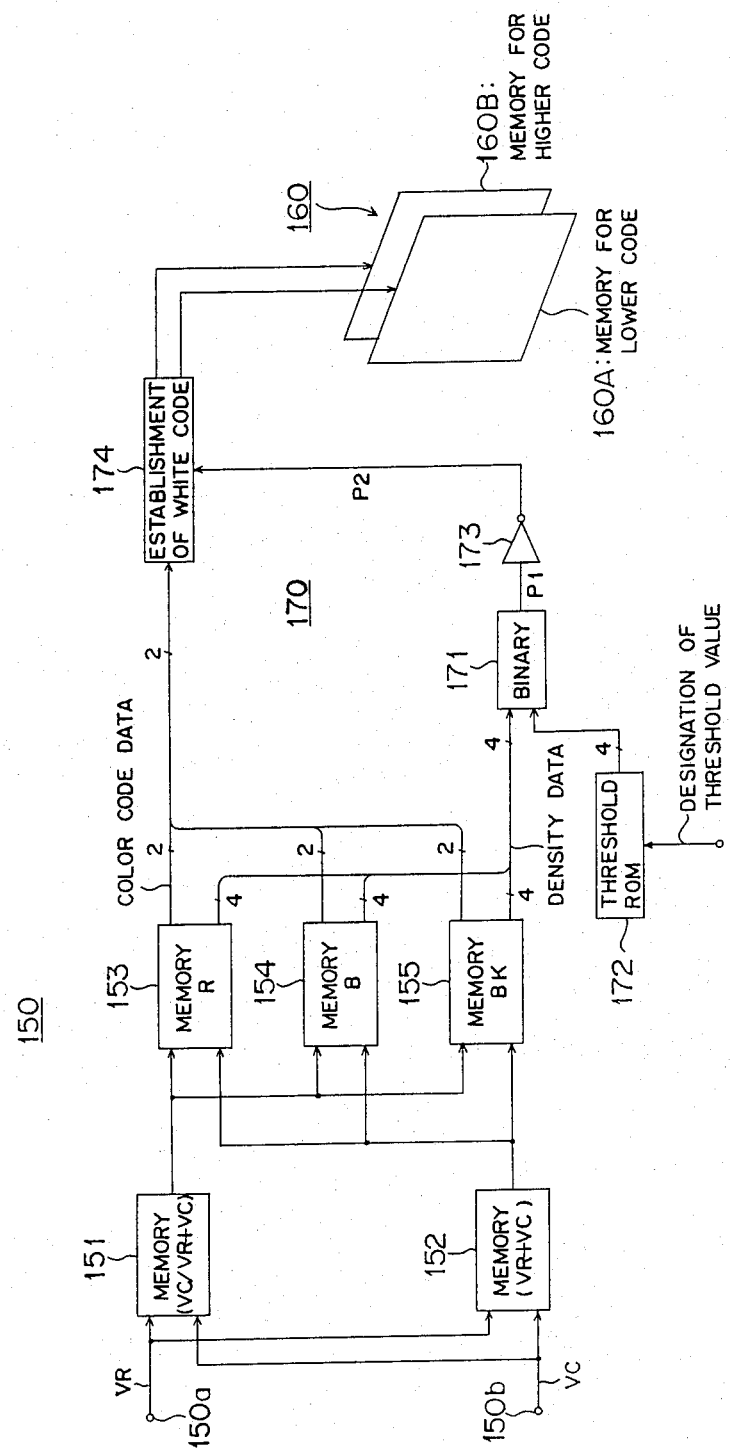
FIG. 10 is a system diagram showing one example a color extractor and a storage unit forming an essential portion of the ,signal processing system of the present invention.

FIG. 10 is a system diagram showing one example of the essential portion of the color extraction circuit 150 for realizing the aforementioned color extractions.

As shown, terminals 150a and 150b are fed with the red signal R and the cyan signal Cy from which the three colors are not extracted yet. These color signals to be used may have been subjected to a gradation change, a gamma correction and so on.

The arithmetically processed data are used as not only an address signal for a memory 152 storing the arithmetic result of (VR+VC) for determining the luminance signal data but also an address signal for a memory 151 storing the arithmetic result of the color difference signal data VC/(VR+VC).

The individual outputs of those memories 151 and 152 are used as an address signal for extracting memories (made of ROMs) 153 to 155, of which the memory 153 is for the red signal R; the memory 154 is for the blue signal B; and the memory 155 is for the black signal BK.

These memories 153 to 155 store the following individual color code data (of 2 bits) in addition to the data of the color extraction map illustrated in FIG. 8, i.e., the density data (of 4 bits).

In case red and blue are considered as the chromatic colors, as described above, the individual color informations themselves can be expressed in 2 bits. Therefore, if the following formulas are assumed; the density data D illustrated in FIG. 8 are not solely stored in the individual memories 153 to 155 but together with the color codes 1, 2, 3 and 0 in the memories 153 to 155:

White=(1, 1)=3;
Black=(0, 0)=0;
Red=(1, 0)=2; and
Blue=(0, 1)=1.

This means that the following data are respectively stored;

0, D - - - Black (Memory 155);
2, D - - - Red (Memory 153); and
1, D - - - Blue (Memory 154).

One example of the storage state is illustrated in FIGS. 11A to 11C. In FIGS. 11A to 11C, the hatched regions correspond to the data storage regions, and letter X denotes the density data in sexidecimal notation.

The regions other than the hatched ones store the color code data "30" indicating the white.

Now, the density data read out sequentially from the individual memories 153 to 155 are made binary in binary means 171 constructing a memory data processor 170. As a result, the density data of 4 bits are made binary in the binary means 171 on the basis of threshold data coming from a threshold ROM 172.

If these binary data are present, moreover, the color codes corresponding to the image data are stored in the storage unit 160.

Otherwise, the color codes corresponding to the white color are stored.

For these storages, as shown, the color code data are fed to a white code generator 174, and the binary data have their phase inverted by an inverter 173 until they are fed as a control signal to the white code generator 174.

Here, without the binary data, i.e., if the document surface is white, the binary data at "L" are obtained from the binary means 171 so that the color code data are transformed, whatever they might be, into white ones and are outputted.

With the binary data, the color code data inputted are outputted as they are.

The white code generator 174 may be exemplified by a logical circuit or a ROM. In case the logical circuit is used, its truth value table is shown in FIG. 12.

Thus, the density data and the color code data are transformed into image data of 2 bits (which is hereinafter called the "storage data"), which are outputted from the white code generator 174. Therefore, the storage unit 160 for storing the storage data may be exemplified by two memory planes 160A and 160B, as shown.

In case one memory 160A is used as a memory of lower bits of the storage data, the other memory 160B is used for higher bits.

Incidentally, it is assumed that one memory plane can store a desired image size in binary data. The memory planes may be exemplified by a dynamic RAM or a static RAM.

If the color informations are stored as the color code data, as described above, the memory planes have the following capacity in case the document 40 has a size of A4 (i.e., 297 mm33 210 mm) so that the storage capacity of the storage unit 160 can be made far smaller than that of the prior art:

$$297 \text{ mm} \times 210 \text{ mm} \times (16 \text{ dots/mm})^2 \times 2 \text{ bits}$$

$$= 31,933,400 \text{ bits}$$

$$\fallingdotseq 4 \text{ megabytes.}$$

Incidentally, if the data are to be stored by the method of the prior art, it is necessary to use the storage unit having the following storage capacity:

$$297 \text{ mm} \times 210 \text{ mm} \times (16 \text{ dots/mm})^2 \times 3 \text{ colors}$$

$$= 47,900,160 \text{ bits}$$

$$\fallingdotseq 6 \text{ megabytes.}$$

Now, in the case of the color codes of 2 bits, as described above, it is possible to store image data of four colors. In case, therefore, the color codes are composed of 3 bits, it is possible to store image data up to eight colors (including the white color). In this case, the prior art method requires seven memory planes, whereas the memory planes may be reduced to a number of the bits of the color codes, i.e., only three memory planes if the processings are accomplished according to the present invention. This makes it possible to reduce the storage capacity of the storage unit 160 to one half or less.

Figure 13:
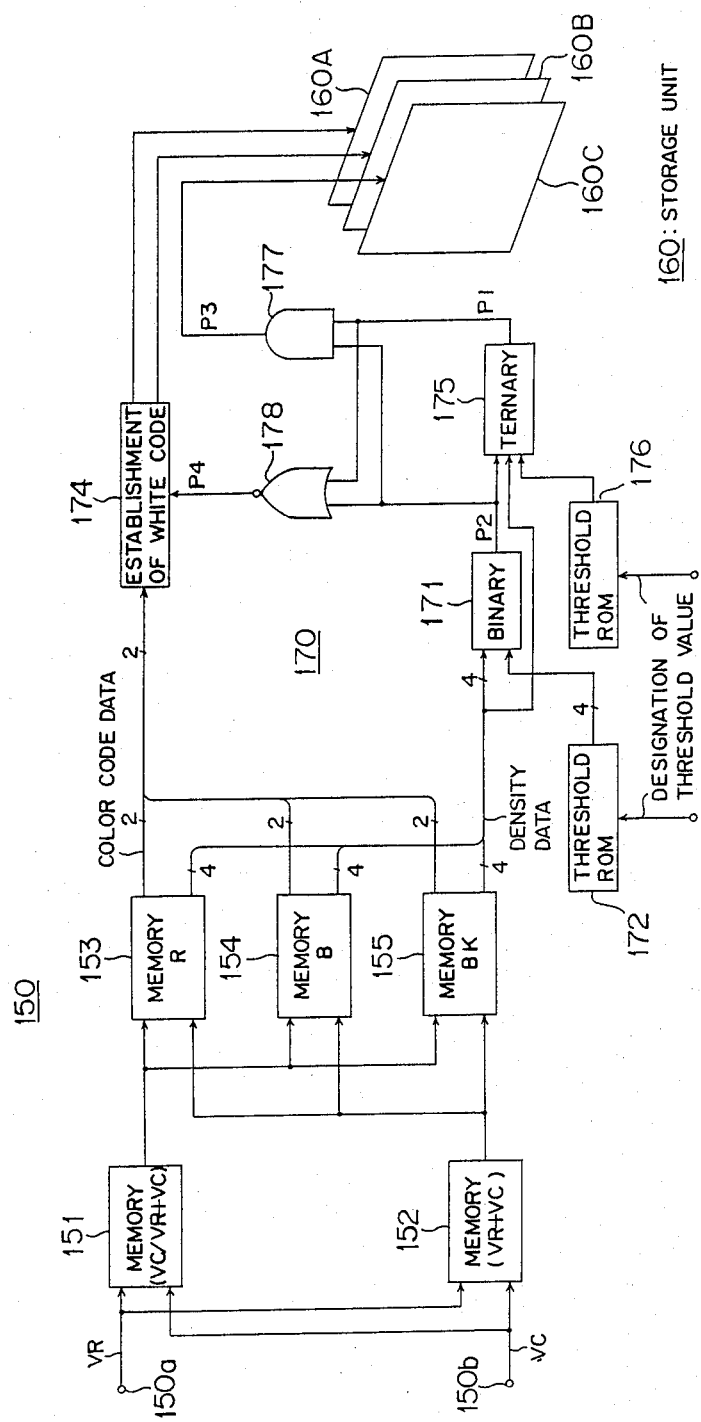
FIG. 13 is a system diagram showing another example of FIG. 10.

FIG. 13 shows one example corresponding to the case in which the density data are made ternary.

Usually, at least two bits are required for displaying ternary data. Since the color codes include a white color code, as is apparent from the examples described hereinbefore, the display can be accomplished with one bit if the white color code is used.

More specifically, the ternary codes other than the white one are able to take a ternary level for the "H" level and a binary level for the 37 L" level. This makes it possible to discriminate the binary codes and the ternary codes with data of one bit.

However, the color codes require two bits, as is apparent from the foregoing examples. Thus, data of one pixel can be expressed in three bits including the color codes. As a result, only three memory planes can store the ternary image of three colors. If the existing method is used, on the contrary, only binary images of three colors can be stored.

Therefore, the storage data processor 170 is constructed, as shown in FIG. 13.

Both the binary data P2 binarized by the binary means 171 and the density data of 4 bits are fed to ternary means 175 so that the binary data P2 are transformed into ternary data on the basis of the threshold data coming from a threshold ROM 176. Ternary data P1 and the binary data P2 are fed to an AND circuit 177, the output P3 of 1 bit of which is stored in a third memory plane 160C. In dependence upon these data contents, the binary data and the ternary data are discriminated from each other.

On the other hand, the ternary data P1 and the binary data P2 are further fed to a NOR circuit 178, the output P4 of which controls the white code generator 174.

Here, the relationships among the data P1 to P4 are tabulated in FIG. 14. The ternary levels are tabulated for convenience of description in connection with the three colors (i.e., white, black and grey) of the luminance informations, for example, although they are in fact the color informations.

According to the table of FIG. 14, the output P4 is at the "H" level for the white level so that the white code (as shown in FIG. 12) is obtained like FIG. 10 from the white code generator 174. At this time, the output P3 takes the "L" level.

Since both the outputs P4 and P3 are at the 37 L" level for the grey level, the input color codes are stored as they are in the memory planes 160A and 160B. As a result, the lower codes of the color codes are left at the "L" level.

For the black level, the output P3 takes the "H" level whereas the output P4 takes the "L" level so that the color codes are stored as they are in the memory planes 160A and 160B. Since, in this case, their lower codes are at the "H" level, it is easily discriminated that the level is ternary.

FIG. 15 shows the case in which a color ghost eliminator 300 is disposed in the aforementioned color extraction circuit 150.

The color ghosts herein termed are the color ghosts other than those which are generated from the mechanical displacement of the pickup element.

These color ghosts are processed not only in the main (i.e., horizontal) scanning direction but also in the auxiliary (i.e., vertical) scanning direction in which the image retainer 201 rotates.

A specific example of the color ghost processing is shown in FIG. 16.

In this example, the horizontal and vertical ghosts are to be eliminated by making use of image data equivalent to seven pixels in the horizontal direction and seven lines in the vertical direction.

The target for this color ghost processing is limited to the color codes of the image data.

Therefore, the color codes read out from the memories 153 to 155 are sequentially fed to and arranged in parallel by a shift register 301 having a structure of 7 bits. These parallel color code data of seven pixels are fed to a horizontal ghost eliminating ROM 302 so that its individual pixels are subjected to the ghost elimination. When these ghost eliminations are ended, the color code data are latched by a latch 303.

On the contrary, the density data outputted from the memories 153 to 155 are fed through a timing adjusting shift register 305 (of 7 bits) to a latch 306 so that the data transfer conditions are so determined as to serially transfer the density data subsequent to the color code data.

The color code data and density data thus serially processed are fed to a next line memory unit 310.

This line memory unit 310 is provided to eliminate the color ghosts in the vertical direction by using the image data of 7 lines. Incidentally, the line memory uses eight lines in total, where one additional line is used for processing the ghosts on real time.

The color code data of 8 lines and the density data are separated from each other by a downstream gate circuit group 320. This gate circuit group 320 is equipped with gate circuits 321 to 328 corresponding to line memories 311 to 318, respectively.

The output data of the eight line memories, which are synchronized by that line memory unit 310, are separated at the gate circuit group 320 into color code data and density data. The color code data thus separated are fed to a selector 330 so that the color code data of the seven line memories necessary for processing the color ghosts are selected. If, in this case, the line memories 311 to 317 are selected, they are sequentially shifted at a next processing timing as if the line memories 312 to 318 are selected.

The color code data of the seven line memories thus selected and synchronized are fed to a next vertical ghost eliminating ROM 340 so that the vertical color ghosts are eliminated.

After this, the resultant color code data are latched by a latch 341.

On the contrary, the density data extracted by the gate circuit group 320 are fed directly to a latch 342 so that they are timed with the color code data until they are outputted.

Figure 17:
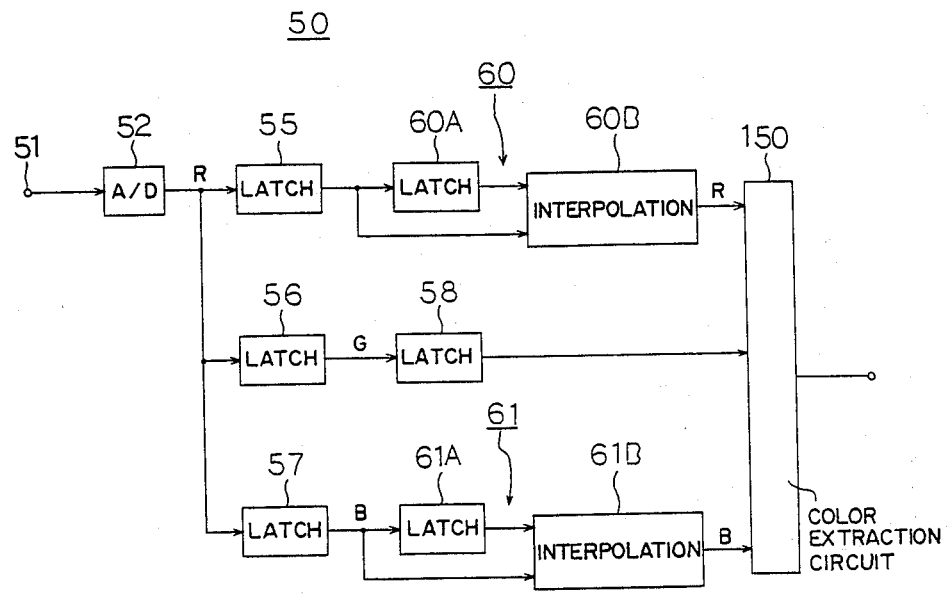
FIG. 17 is a system diagram similar to FIG. 3 but shows a further example of the present invention.
Figure 19:
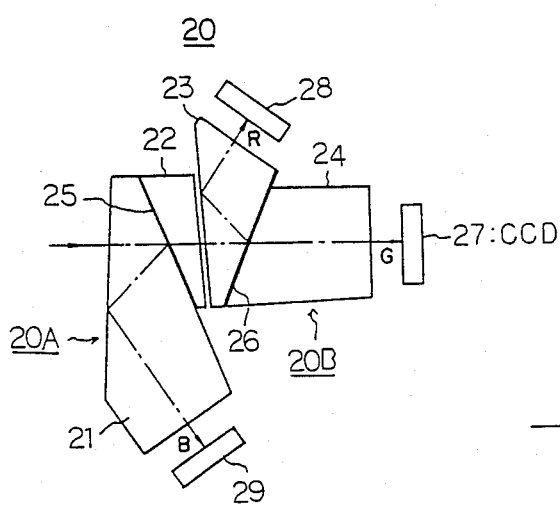
FIGS. 19 and 20 are structures showing the examples of the image pickup system of the prior art.
Figure 20:
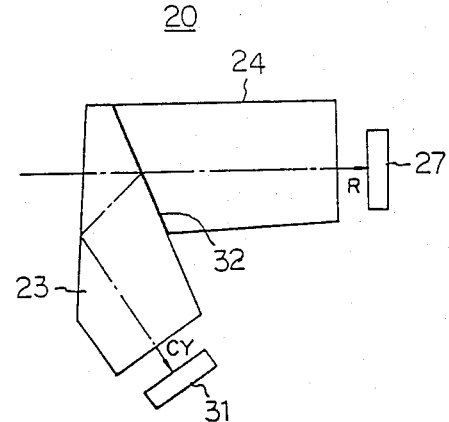

FIG. 17 shows a further example of the present invention.

In this case, the color image informations are transformed into three primary color signals R to B, which are fed directly to the color extraction circuit 150.

In this example, too, the red signal R and the blue signal B are interpolated.

The individual red-to-green color signals R to B thus digitally transformed are fed to the color extraction circuit 150 so that they are subjected to the same extractions as the aforementioned ones.

Figure 18:
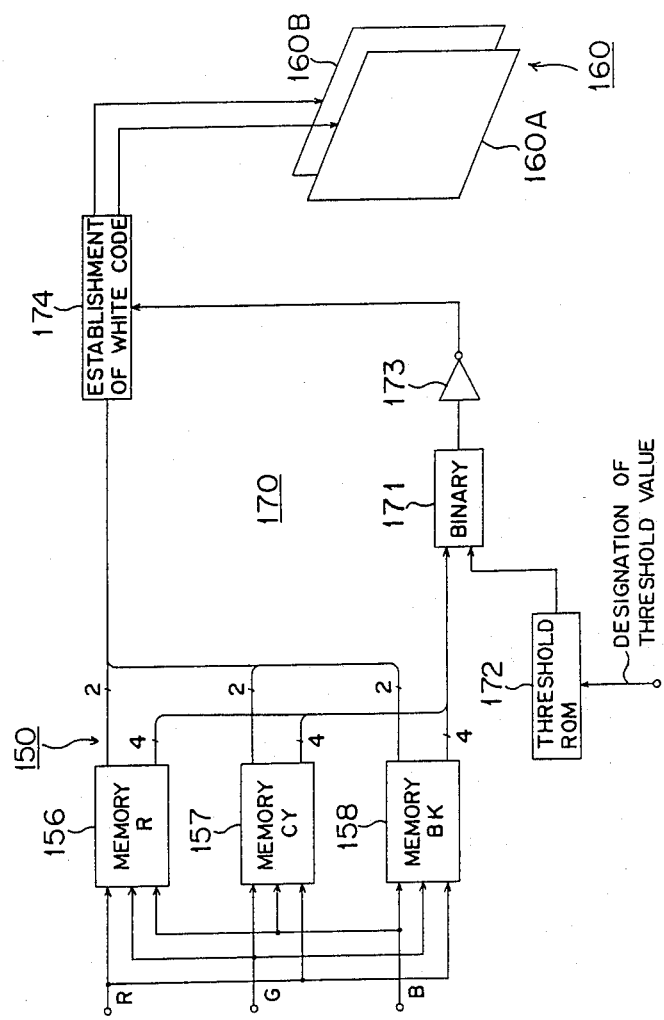
FIG. 18 is a system diagram showing one example of a color extractor used with the example of FIG. 17.

FIG. 18 shows one example of the color extraction circuit 150 including the storage unit 160.

The red-to-blue signals R to B are fed to memories 156 to 158, which store red, cyan and black image data (i.e., the color code data and the density data), to output color code data of 2 bits and density data of 4 bits, respectively. The color code data and the density data are fed through the stored data processor 170 to the storage unit 160 like the aforementioned example.

Incidentally, there has been exemplified hereinbefore, the image pickup system 20 in which the color image informations are extracted into the three primary color signals. Despite of this fact, however, the present invention can be applied to the image pickup system which is constructed to extract the color image informations into signals of complementary colors or other colors.

In the description thus far made, moreover, the present invention has been applied to the image processing apparatus having the electrophotographic type color reproducing machine. It would be easily understandable that the present invention can be applied to another color image processing apparatus, too.

As has been described hereinafter, according to the present invention, the color ghosts, which are established in case a plurality of small pixels compose one pixel, are removed by the interpolations.

According to the present invention, the color signals can be processed on the basis of a plurality of color signals equivalent to those obtained from an identical position so that the color ghosts can be eliminated effectively and reliably.

In case the image pickup system using the aforementioned contact type image sensor is employed, any position adjustment is not naturally required, as is different from the case of using a plurality of pickup elements. The yield can be enhanced to drop the production cost accordingly.

When a plurality of color signals are to be extracted, the data of one pixel are stored in the predetermined memories after they have been separated into the color code data and the density data, until the storage data are stored in the storage unit. As a result, the storage capacity can be improved far better than that of the prior art.

Since, in this case, the storage capacity can be reduced the more for the larger number of color signals to be extracted, the effects of the present invention become more prominent for the increased number of extracted colors.

What is claimed is:

1. A color image processing apparatus comprising an image pickup system having different color filters corresponding to plural groups of small pixels, each of said groups forming one unit of color pixel, and means for correcting an output signal from at least one of the small pixels so that the outputted signals originate from a common position in said unit of color pixel relative to said pickup system.

2. The apparatus of claim 1 wherein said image pickup system comprises a contact-type image sensor.

3. The apparatus of claim 1 wherein said color filters are red, green, and blue color filters.

4. The apparatus of claim 3 wherein said means for correcting an output signal comprises means for interpolating density data of color signals to density data corresponding to the position of the center small pixel.

5. The apparatus of claim 4 wherein the position of the center small pixel corresponds to the position of a green signal.

6. The apparatus of claim 5 wherein said color signals are a red signal and a blue signal.

7. The apparatus of claim 1 wherein said correction is an interpolation of the output signals of a plurality of small pixels.

8. The apparatus of claim 1 wherein a color ghost correction is carried out based on the corrected output signals.

9. The apparatus of claim 1 further comprising means to determine and generate a color signal based on the corrected output signals.

10. The apparatus of claim 8 further comprising means for correcting color ghosts based upon the color signal.

11. A color image processing apparatus wherein one unit of color image signals is formed based on the application of signals outputted by a plurality of small pixels, the outputted signals from at least one of the small pixels being corrected according to the position of the small pixel relative to an image pickup system.

12. The apparatus of claim 10 wherein the correction is an interpolation of the output signals of a plurality of small pixels.

13. The apparatus of claim 10 wherein a color ghost correction is carried out based on the corrected output signal.

* * * * *